United States Patent
Gurvich

(10) Patent No.: US 10,351,392 B1
(45) Date of Patent: Jul. 16, 2019

(54) ESCALATOR AND MOVING WALKWAY SYSTEM WITH SAFETY SENSOR

(71) Applicant: Otis Elevator Company, Farmington, CT (US)

(72) Inventor: Mark R. Gurvich, Middletown, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 16/168,442

(22) Filed: Oct. 23, 2018

(51) Int. Cl.
| | |
|---|---|
| B66B 25/00 | (2006.01) |
| B66B 29/00 | (2006.01) |
| B66B 27/00 | (2006.01) |
| G06K 9/00 | (2006.01) |

(52) U.S. Cl.
CPC ........... B66B 29/005 (2013.01); B66B 25/00 (2013.01); B66B 27/00 (2013.01); *G06K 9/00771* (2013.01); *G06T 2207/30232* (2013.01)

(58) Field of Classification Search
CPC ............................ B66B 25/00; B66B 29/005
USPC .................................................. 198/322, 323
See application file for complete search history.

(56) References Cited

U.S. PATENT DOCUMENTS

| | | | | |
|---|---|---|---|---|
| 6,230,871 | B1 * | 5/2001 | Balzer-Apke | ........... B66B 25/00 198/323 |
| 6,241,070 | B1 | 6/2001 | Loder | |
| 6,267,219 | B1 * | 7/2001 | Spannhake | ............. B66B 27/00 198/322 |
| 8,469,175 | B2 * | 6/2013 | Lanzki | .................... B66B 25/00 198/322 |
| 8,839,942 | B2 * | 9/2014 | Tautz | ................... B66B 29/005 198/323 |
| 9,272,882 | B2 * | 3/2016 | Soldner | .................. B66B 25/00 |

(Continued)

FOREIGN PATENT DOCUMENTS

| | | |
|---|---|---|
| CN | 101386395 B | 6/2011 |
| CN | 101607668 B | 6/2012 |

(Continued)

OTHER PUBLICATIONS

Safe Construction and Installation of Escalators. Code of Practice. International Labour Office—Geneva. Published 1976. http://www.ilo.org/wcmsp5/groups/public/@ed_protect/@protrav/@safework/documents/normativeinstrument/wcms_107895.pdf. 36 Pages.

*Primary Examiner* — Douglas A Hess
(74) *Attorney, Agent, or Firm* — Cantor Colburn LLP

(57) ABSTRACT

Disclosed is a system including a conveyer, a sensor operationally directed to engage the conveyer, a controller for controlling the conveyer and the sensor, the controller renders a plurality of determinations including: a first determination that the conveyer is in an operational state, a second determination that first sensed data dynamically obtained from the sensor is indicative of a first passenger on the conveyer, a third determination to model shape of the first passenger, while the first passenger is on the conveyer, with a first nodal model, a fourth determination to track displacement differentials for the first nodal model, a fifth determination to identify from the differentials an occurrence of an alert condition with the first passenger, at an occurrence of an alert condition, a sixth determination to stop the conveyer, and the controller transmits first instructions to the conveyer to effect the sixth determination.

20 Claims, 2 Drawing Sheets

(56) References Cited

U.S. PATENT DOCUMENTS

| | | | |
|---|---|---|---|
| 9,779,420 B2 * | 10/2017 | Lam | G06Q 30/0265 |
| 9,878,883 B2 * | 1/2018 | Nelson | B66B 29/005 |
| 9,896,309 B2 * | 2/2018 | Wang | B66B 25/00 |
| 10,114,066 B2 * | 10/2018 | Kattainen | B66B 5/0093 |
| 10,155,642 B2 * | 12/2018 | Ghadamossoltani | B66B 25/006 |
| 10,173,864 B2 * | 1/2019 | Hu | B66B 23/20 |
| 10,183,843 B2 * | 1/2019 | Hu | B66B 21/02 |
| 10,202,258 B2 * | 2/2019 | Dold | B66B 5/14 |
| 2006/0001545 A1 | 1/2006 | Wolf | |
| 2016/0272467 A1 | 9/2016 | Ghadamossoltani | |
| 2018/0032598 A1 | 2/2018 | Senger et al. | |

FOREIGN PATENT DOCUMENTS

| | | | |
|---|---|---|---|
| CN | 106127148 A | 11/2016 | |
| CN | 106241584 A | 12/2016 | |
| CN | 106503632 A | 3/2017 | |
| JP | 2006225057 A | 8/2006 | |
| JP | 2010070299 A | 4/2010 | |
| KR | 101329526 B1 | 11/2013 | |
| WO | 2016173770 A1 | 11/2016 | |
| WO | 2017140568 A1 | 8/2017 | |

* cited by examiner

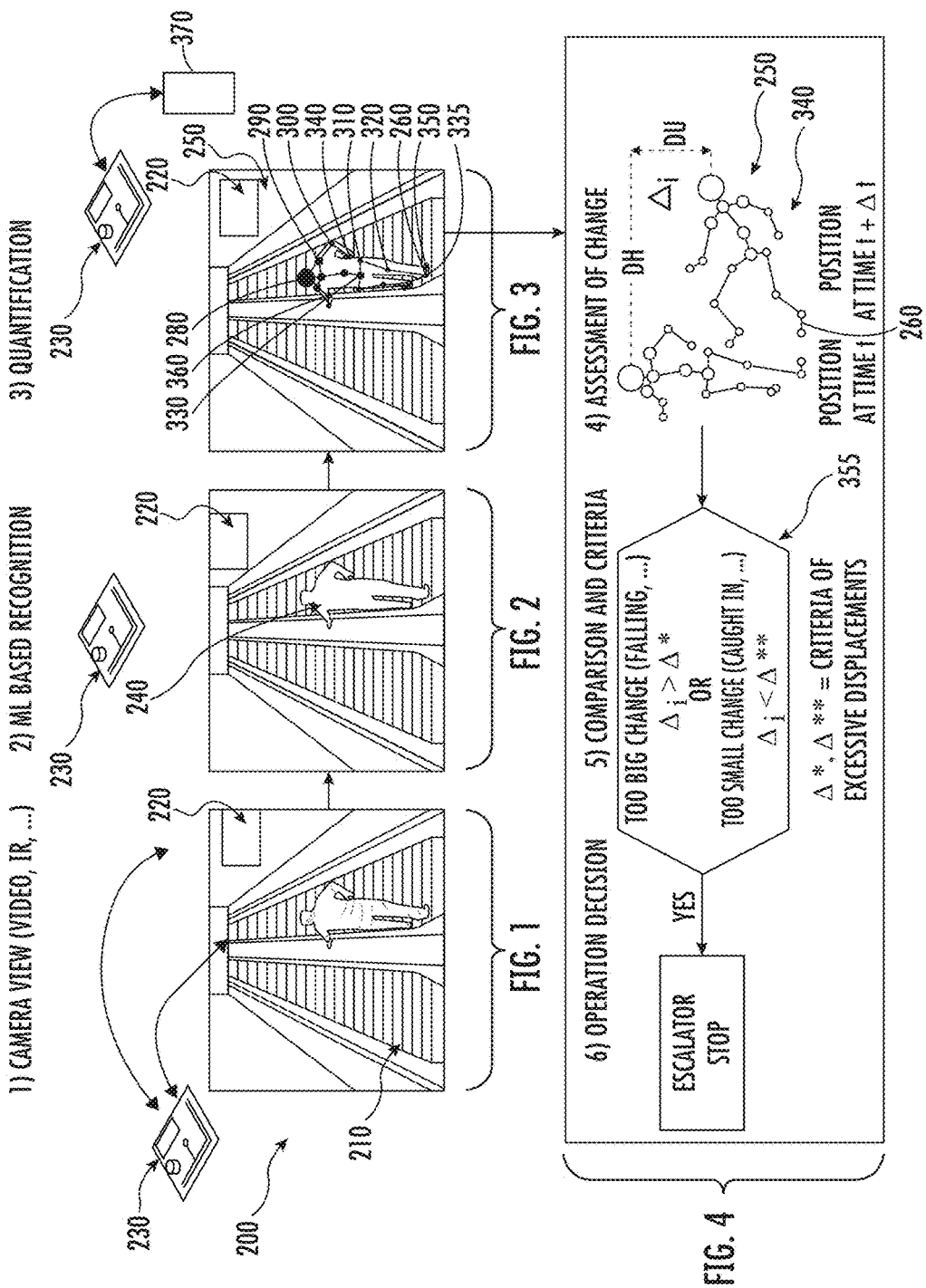

ESCALATOR AND MOVING WALKWAY SYSTEM WITH SAFETY SENSOR

BACKGROUND

The embodiments herein relate to operation of a conveyer system, such as an escalator or a moving walkway systems, and more specifically to conveyer system with one or more safety sensors.

Escalator safety related incidents are known to occur based on passenger behavior, including when adults and children fall while the escalator is motion. Similar safety issues can be expected using moving walkway, although less frequently and usually with less severe consequences.

BRIEF SUMMARY

Disclosed is a system comprising: a conveyer, a sensor operationally directed to engage the conveyer, a controller for controlling the conveyer and the sensor, wherein the controller is configured to render a plurality of determinations including: a first determination that the conveyer is in an operational state, a second determination that first sensed data dynamically obtained from the sensor is indicative of a first passenger on the conveyer, a third determination to model shape of the first passenger, while the first passenger is on the conveyer, with a first nodal model, a fourth determination to track displacement differentials for the first nodal model, a fifth determination to identify from the differentials an occurrence of an alert condition with the first passenger, at an occurrence of an alert condition, a sixth determination to stop the conveyer, and the controller is configured to transmit first instructions to the conveyer to effect the sixth determination.

In addition to one or more of the above disclosed features or as an alternate the nodal model consists of one or more nodes representing the first passenger.

In addition to one or more of the above disclosed features or as an alternate the one or more nodes represent points associated with physical features of the passenger including one or more of head, elbow, and knee.

In addition to one or more of the above disclosed features or as an alternate the displacement differentials include one or more of relative distance and/or angular displacements per specified interval of time or their combinations.

In addition to one or more of the above disclosed features or as an alternate the controller measures displacement differentials at a predetermined time interval to determine one or more displacement rates.

In addition to one or more of the above disclosed features or as an alternate the controller may determine an alert condition exists when one or more displacement differentials and/or one or more respective differential rates are outside a predetermined range.

In addition to one or more of the above disclosed features or as an alternate the controller may determine an alert condition exists when: one or more vertical displacement differentials and/or one or more respective vertical differential rates are above a first threshold, and/or one or more horizontal displacement differentials and/or one or more respective horizontal differential rates are below a second threshold, and/or one or more total displacement differentials and/or one or more respective total differential rates are below a third threshold, and/or one or more angular differentials and/or one or more respective angular differentials are below a fourth threshold.

In addition to one or more of the above disclosed features or as an alternate the sensor is at least one video camera and/or, at least, one infrared camera or their combination.

In addition to one or more of the above disclosed features or as an alternate the conveyer system is an escalator or moving walkway.

In addition to one or more of the above disclosed features or as an alternate the system includes a building management system (BMS) and the controller communicates an occurrence of an alert condition to the BMS.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements. Although the disclosure is illustrated below on examples of escalators, the same implementations are also applied to moving walkway systems.

FIGS. 1-3 illustrates components of an escalator system according to an embodiment as well as system processes utilized to generate models of persons on an escalator according to an embodiment;

FIG. 4 illustrates processes utilized to identify and respond to alert conditions when tracking the nodal models.

DETAILED DESCRIPTION

Figure 5:
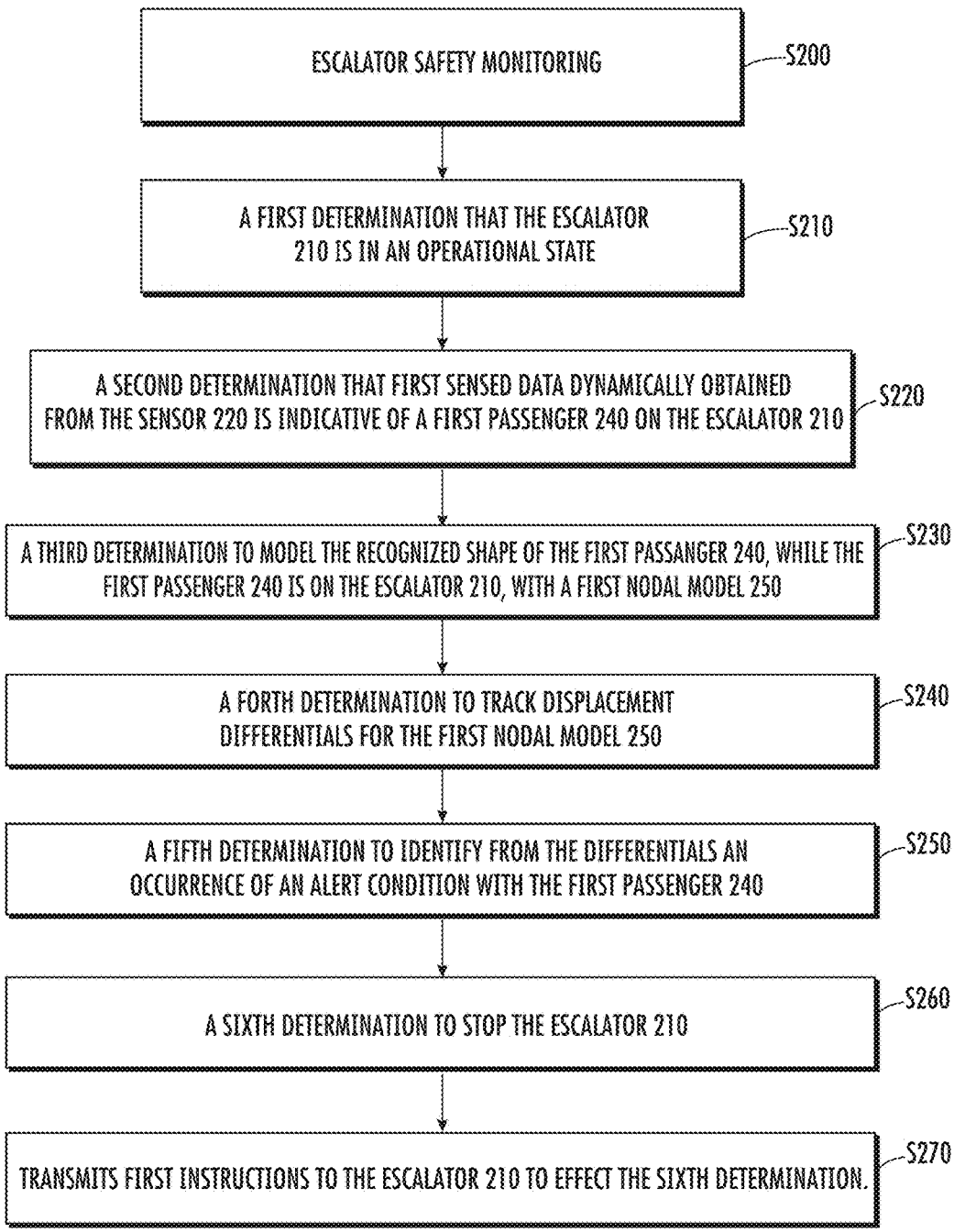
FIG. 5 illustrates an algorithm for performing the process illustrated in FIGS. 1-4 according to an embodiment.

Turning to FIG. 1, an escalator system 200 is disclosed comprising an escalator 210, a sensor 220 operationally directed to engage the escalator 210, and a controller 230 for controlling the escalator 210 and sensor 220. Sensor 220 can be, for example, in a form of video camera or infrared camera. One or more sensors 220 can be used. Sensors 220 can be the same or a combination of different devices. It is to be appreciated that the escalator 210 can be another form of moving platform such as a moving walkway.

Turning to FIG. 5, the controller 230 is configured to render a plurality of determinations when performing a process S200 of escalator safety monitoring. At step S210 the controller 230 renders a first determination that the escalator 210 is in an operational state.

With reference to FIG. 1-2 and FIG. 5, at a second step S220 the controller 230 renders a second determination that first sensed data dynamically obtained from the sensor 220 is indicative of a first passenger 240 on the escalator 210. This can be performed, for example, by comparing the sensed data with shapes stored in accessible memory to identify for example human body shapes. Different, already developed and/or future appropriate, computer vision methods for object recognitions can be utilized.

With reference to both FIG. 3 and FIG. 5, at a third step S230, the controller 230 renders a third determination to model the recognized shape of the first passenger 240, while the first passenger 240 is on the escalator 210, with a first nodal model 250. As used herein a "nodal model" such as nodal model 250 is a population of all nodes in a recognized shape. The model of the shape can be defined, for example, in a form of a finite number of nodes and their positions in space, describing the shape with specified level of accuracy. An example shown in FIG. 3 illustrates such definition of the model 250 through a finite number of nodes 260, 270, 280, 290, 300, 310, 320, 330, 335, 340, 350, 360. Different already developed and/or future appropriate methods for such quantification can be applied.

With reference to both FIGS. 4 and 5, at a fourth step S240 the controller 230 renders a fourth determination to track displacement differentials as function of time of downselected parameters of the first nodal model 250. In illustration shown in FIG. 3, these parameters are, for example, nodes 260, 270, 280, 290, 300, 310, 320, 330, 335, 340, 350, 360. At a fifth step S250 the controller 230 renders a fifth determination to identify from the differentials as applied to a set of predetermined parameters 365, such as maximum allowed differentials for specific nodes grouped and individually, whether an alert condition has occurred with the first passenger 240. Similarly, some predetermined parameters can be applied for assessment of minimal allowed differentials for specific nodes grouped and individually. More complex predetermined mathematical conditions to correlate the alert conditions with the differentials can be applied in other embodiments as well. At a sixth step S260, when the controller 230 identifies an alert condition, the controller 230 renders a sixth determination to stop the escalator 210 or apply other specified service actions, such, for example, speed reduction, signal to a service management, etc. At a seventh step S270 the controller 230 transmits first instructions to the escalator 210 to effect the sixth determination.

Turning back to FIG. 3, the nodal model 250 may consist of one or more nodes representing one or more body joints for the first passenger 240 including, for example, one or more of: (i) head 280, (ii) one or both shoulder joints 290, (iii) one or both elbow joints 300, (iv) one or both hip joints 310, (v) one or both knee joints 320, (vi) pelvis 330, (vii) one or both ankle joints 335, (viii) one or both hands 340, (ix) one or both feet 350, and (x) back or sternum 360, and (xi) neck 270. Other nodal definitions of human body can be equally used in different embodiments, for example, a center of gravity or mass for a body, a midpoint between eyes, etc., i.e., in general, any other locations of the body.

According to an embodiment the displacement differentials measured as relative nodal displacements per specified interval of time. These displacements include one or more of vertical displacements DV and/or horizontal displacements DH or geometrical metrics of motion in three-dimensional space, defined, for example, through length and/or angles. In addition, differential displacements may be calculated as a non-linear function of individual displacement differential components and/or their combinations. It is to be appreciated that displacements can be described in different forms, for example, length and angle, in polar or spherical coordinate systems, etc. Displacements can also be measured in different direction (e.g., parallel to the escalator, i.e., under certain angles).

Displacement differentials defined as relative nodal displacements per specified interval of time are similar to physical meaning of a velocity, averaged per the same interval of time. More complex definitions of displacement differentials, for example, similar to physical meaning of acceleration, can be used in other embodiments as well. In these cases, measurements of nodal positions are needed per several, more than two, moments of time. These measurements can be then used in follow-up quantification of average acceleration according to well-established numerical methods for calculation of second derivatives.

According to an embodiment the displacement differentials may be measured by the controller 230 at a predetermined time interval to determine one or more displacement rates or combination of rates. According to an embodiment the controller 230 may determine that an alert condition exists when one or more displacement differentials are outside a predetermined range. According to an embodiment the controller 230 may determine an alert condition exists when one or more vertical displacement differentials and one or more respective vertical differential rates are above a first threshold. This may represent a falling passenger. It is to be appreciated that different body joints may have different thresholds that define an alert. For example rapid hand motion over a long span may not represent failing, while the same motion for a head may represent falling. According to an embodiment the controller 230 may determine an alert condition exists when one or more horizontal displacement differentials and a respective one or more horizontal differential rates are below a second threshold. This may represent a passenger 240 that is unable to depart the escalator 210. For example, the passenger 240 may have clothing caught in an escalator tread. Although the above-mentioned examples are based on consideration of vertical or horizontal displacements, different definitions of the differentials per specified time interval can also be used in other embodiments, for example, in any orientation or in form of any angular movements or any of their combinations.

According to an embodiment the sensor 220 may be at least one video camera, and/or at least one infrared (IR) camera or their combinations. According to an embodiment the system includes a building management system (BMS) 370. The controller 230 may communicate an occurrence of an alert condition to the BMS 370.

The above disclosure provides one or more sensors including but not limited to video or IR camera(s) and one or more controllers to provide object recognition for 1) monitoring of escalator area(s) 2) obtaining sensed data representative of individual people on the escalator; 3) transforming the data into simplified forms comprising a finite number of selected metrics (for example, nodal positions of a head, elbows, knees, and connecting elements representing limbs.); 4) an assessment of the position change of nodes and elements as functions of time in a predetermined interval (delta t); 5) a quantifying of positional changes with previously defined alert criteria; and 6) halting of the escalator upon detection of an alert condition. Examples of such alert criteria may be, among other things, a relative change of vertical position of a node that is greater than a first threshold, where each node has a unique allowable threshold (head, knees, etc.) that indicate falling, or a change that is below a second threshold along a horizontal position of human foot (potentially indicating a person stuck between escalator steps). Upon halting the escalator, a corresponding signal (or actual image, video) may be sent to a dispatcher, for example, for further processing (for example, calling for help, etc.).

The disclosed embodiments may provide benefits of both time (relatively immediate response) and cost (the process is relatively self-governing). The proposed system may not require change of existing escalator designs and may be relatively easily incorporated to existing systems.

The above disclosed system comprises a conveyer system that moves passengers between floors and/or along a single floor. Such conveyer systems are identified herein as escalators, however other application to other forms of people movers is considered within the scope of the disclosure.

A building management system (BMS), reference above, may be otherwise known as a building automation system (BAS). The BMS is a computer-based control system installed in buildings that may have a need for controlling and monitoring mechanical and electrical equipment such as ventilation, lighting, power systems, fire systems, security systems, fire alarm systems and elevator systems. In addition to controlling an internal environment in a building, BMS systems may provide for access control (access doors) for implementing building security protocols, or to control other security systems such as closed-circuit television (CCTV) and motion detectors. A BMS may be responsible for controlling equipment that accounts for a majority of energy usage in a building.

As used herein, the controller, sensor, and other controllable devices may be considered "smart devices" and contain one or more processors capable of communication using with other such devices by applying wired and/or wireless telecommunication protocols. Protocols applied by smart devices may include local area network (LAN) protocols and/or a private area network (PAN) protocols. LAN protocols may apply Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radio-frequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:
   a conveyer,
   a sensor operationally directed to engage the conveyer,
   a controller for controlling the conveyer and the sensor,
   wherein the controller is configured to render a plurality of determinations including:
   a first determination that the conveyer is in an operational state,
   a second determination that first sensed data dynamically obtained from the sensor is indicative of a first passenger on the conveyer,
   a third determination to model a shape of the first passenger, while the first passenger is on the conveyer, with a first nodal model,
   a fourth determination to track displacement differentials for the first nodal model,
   a fifth determination to identify from the differentials an occurrence of an alert condition with the first passenger,
   at an occurrence of an alert condition, a sixth determination to stop the conveyer, and
   the controller is configured to transmit first instructions to the conveyer to effect the sixth determination.

2. The system of claim 1 wherein the nodal model consists of one or more nodes representing the first passenger.

3. The system of claim 2 wherein the one or more nodes represent points associated with physical features of the passenger including one or more of head, elbow, and knee.

4. The system of claim 1 wherein the displacement differentials include one or more of relative distance and/or angular displacements per specified interval of time or their combinations.

5. The system of claim 4 wherein the controller measures displacement differentials per the specified interval of time to determine one or more displacement rates.

6. The system of claim 5 wherein the controller determines an alert condition exists when one or more displacement differentials and/or one or more respective differential rates are outside a predetermined range.

7. The system of claim 6 wherein the controller determines an alert condition exists when:
one or more vertical displacement differentials and/or one or more respective vertical differential rates are above a first threshold, and/or
one or more horizontal displacement differentials and/or one or more respective horizontal differential rates are below a second threshold, and/or
one or more total displacement differentials and/or one or more respective total differential rates are below a third threshold, and/or
one or more angular differentials and/or one or more respective angular differentials are below a fourth threshold.

8. The system of claim 1 wherein the sensor is at least one video camera and/or, at least, one infrared camera or their combination.

9. The system of claim 1 wherein the conveyer system is an escalator or moving walkway.

10. The system of claim 1 comprising a building management system (BMS) and the controller communicates an occurrence of an alert condition to the BMS.

11. A method of conveying a passenger with a system, the system including: a conveyer, a sensor operationally directed to engage the conveyer, and a controller for controlling the conveyer and the sensor,
wherein the method comprises the controller rendering a plurality of determinations including:
a first determination that the conveyer is in an operational state,
a second determination that first sensed data dynamically obtained from the sensor is indicative of a first passenger on the conveyer,
a third determination to model a shape of the first passenger, while the first passenger is on the conveyer, with a first nodal model,
a fourth determination to track displacement differentials for the first nodal model,
a fifth determination to identify from the differentials an occurrence of an alert condition with the first passenger,
at an occurrence of an alert condition, a sixth determination to stop the conveyer, and
transmitting first instructions to the conveyer to effect the sixth determination.

12. The method of claim 11 wherein the nodal model consists of one or more nodes representing the first passenger.

13. The method of claim 12 wherein the one or more nodes represent points associated with physical features of the passenger including one or more of head, elbow, and knee.

14. The method of claim 11 wherein the displacement differentials include one or more of relative distance and/or angular displacements per specified interval of time or their combinations.

15. The method of claim 14 wherein the controller measures displacement differentials per the specified interval of interval of time to determine one or more displacement rates.

16. The method of claim 15 wherein the controller determines an alert condition exists when one or more displacement differentials and/or one or more respective differential rates are outside a predetermined range.

17. The method of claim 16 wherein the controller determines an alert condition exists when:
one or more vertical displacement differentials and/or one or more respective vertical differential rates are above a first threshold, and/or
one or more horizontal displacement differentials and/or one or more respective horizontal differential rates are below a second threshold, and/or
one or more total displacement differentials and/or one or more respective total differential rates are below a third threshold, and/or
one or more angular differentials and/or one or more respective angular differentials are below a fourth threshold.

18. The method of claim 11 wherein the sensor is at least one video camera and/or, at least, one infrared camera or their combination.

19. The method of claim 11 wherein the conveyer system is an escalator or moving walkway.

20. The method of claim 11 comprising a building management system (BMS) 370 and the controller communicates an occurrence of an alert condition to the BMS 370.

* * * * *